Feb. 7, 1939.  J. C. SLONNEGER  2,146,690
COUNTERWEIGHTED CRANK
Filed July 27, 1936
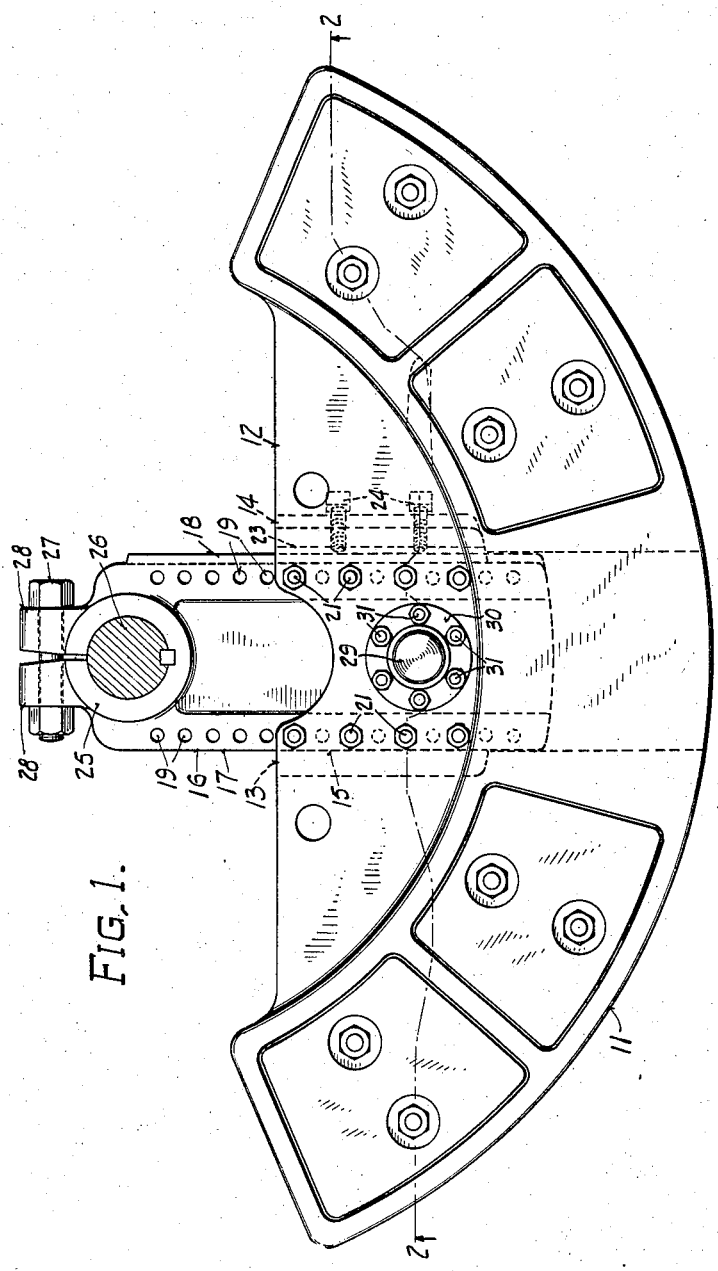
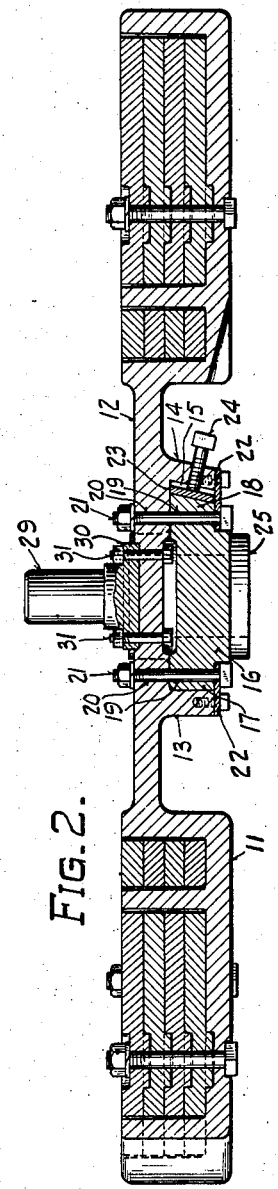
INVENTOR.
John C. Slonneger
BY
ATTORNEY.

Patented Feb. 7, 1939

2,146,690

UNITED STATES PATENT OFFICE 2,146,690

COUNTERWEIGHTED CRANK

John C. Slonneger, Tulsa, Okla., assignor to The Falk Corporation, Milwaukee, Wis., a corporation of Wisconsin Application July 27, 1936, Serial No. 92,747

6 Claims. (Cl. 74—591)

This invention relates to counterweighted cranks for driving oilwell pumps and like equipment.

A counterweighted crank of this same general type is disclosed in my copending application, Serial No. 57,689, filed January 6, 1936.

An oilwell pumping apparatus ordinarily includes a long string of pump rods which lead to the bottom of the well and which are supported from and reciprocated by one end of a walking beam arranged at the head of the well. The walking beam is commonly actuated by a power driven rotary crank connected to the other end thereof through a wrist pin and pitman.

It is common in such apparatus to regulate the stroke of the pump by varying the distance between the wrist pin and the crank shaft, and to fix a counterweight to the end of the crank to somewhat balance the load of the pump. In the application identified above, there is shown a counterweighted crank in which the position of the counterweight is automatically changed upon change in the length of the crank, so that the effective counterbalancing force relative to the pump load remains substantially constant. There is also shown a novel and improved means for adjusting the length of the crank. All this is accomplished by mounting counterweights and the wrist pin in a casting having an elongated slot, in which a mounting block carried by the crank shaft is fastened by bolts, and adjustable along the length of the slot toward or away from the wrist pin.

Equipment of the character described normally operates under very heavy loads. In the machine described in the application identified above, the adjustable connection between the mounting block and the member carrying the counterweight and wrist pin, occurs very near to the crank shaft, so that torsional stresses are set up tending to twist the block within the slot. Moreover, in that application, and normally in the prior art, the wrist pin is inserted into a hole in the crank device, and subjected to wear and strain by the pounding occurring under the heavy loads usually encountered.

An object of the present invention is to provide a crank for the purposes described having a wrist pin and counterweight adjustable simultaneously relative to a crank arm, which will operate without twisting or torsional stresses upon the adjustable connection.

Another object is to provide such a crank in which the portion immediately gripping the crank shaft may be made integral with the crank arm.

Another object is to provide such a crank with an improved method of attaching a wrist pin to the crank device.

Other objects and advantages will appear, expressed or implied, from the following description of an illustrative embodiment of the invention.

In the accompanying drawing:—

Figure 1 is a view in elevation of a counterweighted crank constructed in accordance with the present invention.

Fig. 2 is a transverse sectional view on the line 2—2 of Fig. 1.

The crank selected for illustration comprises a weighted casting 11 in a shape resembling a segment of a circle. Through the center of the segment runs a somewhat thinner portion forming a plate 12. Upon this plate are carried two ribs 13 and 14 extending radially of the segment and forming with the plate 12 a groove 15.

A crank arm 16, formed of a heavy bar of metal, is shaped to slide within the groove 15. The outer edges of the crank arm 16 are cut away to form flanges 17 and 18, each carrying a series of perforations 19. In the plate 12 within the groove 15 is formed another series of perforations 20 which may be brought into register with the perforations 19 in the crank arm. By means of bolts 21 passing through the perforations 19 and 20, the casting 11 may be securely fixed to the crank arm 16. As the series of perforations 19 extends along substantially the length of the crank arm, it will be noted that the position of the casting 11 upon the crank arm 16 may be varied substantially throughout the length of the crank arm 16.

To prevent total disengagement of the crank arm 16 from the casting 11 when the bolts 21 are withdrawn for adjustment of the length of the crank, a thin plate 22 is bolted or otherwise secured to the outer edges of each of the ribs 13 and 14 and extends inwardly to cover the flanges 17 and 18 and thus confine the crank arm within the groove 15.

Because of the terrific loads under which a device of this kind operates, it is of great importance that the crank arm 16 be secured within the groove 19 so solidly as to eliminate play between the crank arm and the casting 11. For this reason, a straight gib 23 is inserted into the groove 15 between the crank arm 16 and the rib 14. A plurality of set screws 24 are provided which pass through the rib 14 and serve to tighten the gib 23 against the crank arm 16 within the groove 15. The rib 14 is preferably undercut so that its inner face is inclined slightly inward toward the groove 15, and the set screws 24 are also similarly inclined so as to render them more readily accessible and so that the pressure which they induce tends to seat the crank arm 16 firmly against the bottom of the groove 15.

At its other end the crank arm 16 is formed to provide an integral hub 25 designed for mounting on a drive shaft 26. The hub 25 is keyed or otherwise fixed to the shaft so as to effect rotation of the crank arm with the shaft. To effect a solid grip of the hub on the shaft 26, the hub is split at the side opposite the crank arm 16 and clamped onto the shaft by a bolt 27, which extends through lugs 28 on the hub.

Power is transmitted from the crank to the load through a wrist pin 29. This wrist pin 29 is secured directly to the plate 12 of the casting 11 so that variation of the position of the casting 11 upon the crank arm 16 will accomplish automatically a corresponding adjustment of the position of the wrist pin 29.

To prevent play and wear between the wrist pin 29 and the crank, the wrist pin is attached to the plate 12 in a novel manner, by bolting it to the plate. The wrist pin 29 has a flange 30 formed upon its inner end, adapted to seat snugly within a slight recess formed in the face of the plate 12. A peripheral series of bolts 31 in the flange 30 and passing through the plate 12 serve to hold the wrist pin 29 solidly to the plate 12. It will be noted that a portion of the plate 12 within the groove 15 is slightly cut away to provide clearance for the heads of the bolts 31 between the plate 12 and the crank arm 16.

Various changes may be made in the embodiments of the invention hereinabove specifically described without departing from or sacrificing the invention as defined in the appended claims.

I claim:—

1. An unbalanced rotary crank comprising a counterbalance member, a wrist pin carried by the member, a crank arm releasably secured to the member, the member being relatively adjustable lengthwise of the crank arm to regulate the effective length of the crank, and means for mounting the crank arm upon a drive shaft.

2. An unbalanced rotary crank for driving oil-well apparatus, comprising a crank arm mountable upon a drive shaft, a member mounted for adjustment lengthwise of and upon the arm, a wrist pin carried by the member, and a counterbalance carried by the member, the wrist pin and counterbalance being adjustable as a unit relative to the drive shaft by adjustment of the member upon the crank arm.

3. An unbalanced rotary crank comprising a crank arm having one end formed to receive a drive shaft, a member mounted on the arm and adjustable over substantially the length of the arm, a wrist pin carried by the member, and a counterweight carried by the member with the center of gravity of said counterweight adjacent said wrist pin in all positions of adjustment of said member.

4. An unbalanced rotary crank comprising a member having a heavily weighted portion, a groove formed on the member, a crank arm slidable in the groove, a series of perforations along each edge of the crank arm over substantially the length thereof, a plurality of bolts passing through the member within the groove and disposed to pass through some of the perforations to secure the member to the crank arm, the position of the member on the crank arm being adjustable by engaging the bolts with various perforations, a hub formed on the end of the crank arm opposite the member for attachment to a drive shaft, and a wrist pin carried by the member.

5. An unbalanced rotary crank comprising a counterbalance member, a wrist pin carried by said member, two parallel ribs on said member coacting therewith to form a groove, a crank arm lengthwise adjustable within the groove, means adjustably securing the crank arm to the member, and means within the groove for tightening the crank arm between the ribs to prevent play between the crank arm and the groove.

6. A rotary crank comprising a member having a counterbalance portion, a wrist pin carried by said member, a rib on said member, a second rib on said member parallel to the first named rib and coacting therewith and with said member to form a groove, a crank arm slideable lengthwise within the groove, a plurality of bolts adjustably securing the crank arm to the member, a gib in the groove between the crank arm and the first named rib, and a plurality of set screws in said rib for tightening the gib and the crank arm within the groove.

JOHN C. SLONNEGER.